United States Patent
Jo et al.

(10) Patent No.: US 11,102,670 B2
(45) Date of Patent: Aug. 24, 2021

(54) METHOD FOR TRANSMITTING LOSSLESS DATA PACKET BASED ON QUALITY OF SERVICE (QOS) FRAMEWORK IN WIRELESS COMMUNICATION SYSTEM AND A DEVICE THEREFOR

(71) Applicant: LG Electronics Inc., Seoul (KR)

(72) Inventors: Geumsan Jo, Seoul (KR); Seungjune Yi, Seoul (KR); Heejeong Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 161 days.

(21) Appl. No.: 16/492,255

(22) PCT Filed: Feb. 26, 2018

(86) PCT No.: PCT/KR2018/002325
§ 371 (c)(1),
(2) Date: Sep. 9, 2019

(87) PCT Pub. No.: WO2018/174420
PCT Pub. Date: Sep. 27, 2018

(65) Prior Publication Data
US 2021/0204160 A1 Jul. 1, 2021

Related U.S. Application Data

(60) Provisional application No. 62/475,851, filed on Mar. 23, 2017.

(51) Int. Cl.
*H04W 28/02* (2009.01)
*H04W 28/14* (2009.01)

(52) U.S. Cl.
CPC .......... *H04W 28/02* (2013.01); *H04W 28/14* (2013.01)

(58) Field of Classification Search
CPC ... H04W 28/02; H04W 28/14; H04W 28/085; H04W 28/0967; H04W 76/32; H04W 76/34; H04W 76/38
See application file for complete search history.

(56) References Cited

U.S. PATENT DOCUMENTS

9,629,173 B2 *  4/2017  Karlsson ............... H04W 72/06
2007/0259673 A1 * 11/2007  Willars ................. H04L 67/141
                                                         455/453

(Continued)

FOREIGN PATENT DOCUMENTS

KR    1020140133346 A    11/2014

OTHER PUBLICATIONS

Nokia, Alcatel-Lucent Shanghai Bell, "QoS flow relocation", 3GPP TSG-RAN WG2 Meeting #97, Feb. 13-17, 2017, R2-1700814.

(Continued)

*Primary Examiner* — Hoang-Chuong Q Vu
(74) *Attorney, Agent, or Firm* — Dentons US LLP

(57) ABSTRACT

The present invention relates to a wireless communication system. More specifically, the present invention relates to a method and a device for transmitting lossless data packet based on QoS framework in wireless communication system, the method comprising: starting a timer for a first QoS flow when a DRB which is mapped to the first QoS flow is changed from a first DRB to a second DRB; delivering packets of the first QoS flow received from the first DRB to an upper layer while the timer is running; when the timer expires, starting to deliver the packets of the first QoS flow received from the second DRB while stopping the delivering packets of the first QoS flow received from the first DRB.

14 Claims, 15 Drawing Sheets

(56) References Cited

U.S. PATENT DOCUMENTS

| | | | |
|---|---|---|---|
| 2015/0215987 A1* | 7/2015 | Kim | H04L 1/08 |
| | | | 370/329 |
| 2016/0044639 A1 | 2/2016 | Yi et al. | |
| 2016/0234847 A1* | 8/2016 | Zhang | H04L 5/0007 |
| 2016/0286412 A1* | 9/2016 | Kim | H04W 72/0406 |
| 2017/0171905 A1* | 6/2017 | Uchino | H04W 72/04 |
| 2017/0303170 A1* | 10/2017 | Uchino | H04W 76/15 |
| 2018/0092146 A1* | 3/2018 | Hong | H04W 36/0055 |
| 2019/0254086 A1* | 8/2019 | Tang | H04W 76/10 |

OTHER PUBLICATIONS

ZTE, ZTE Microelectronics, "Further discussion on the new UP protocol layer for QoS", 3GPP TSG-RAN WG2 Meeting #97, Feb. 13-17, 2017, R2-1701119.

Huawei, HiSilicon, "QoS Flow to DRB Mapping", 3GPP-TSG2 Meeting #97, Feb. 13-17, 2017, R2-1701205.

ITRI, "Discussion on QoS flow ID", 3GPP TSG-RAN WG2 Meeting #97, Feb. 13-17, 2017, R2-1701346.

Huawei, HiSilicon, "TS 23.502 End-Marker during HO Procedure", SA WG2 Meeting #120, Mar. 27-31, 2017, S2-172026, XP051257599.

* cited by examiner (a) Control-Plane Protocol Stack (b) User-Plane Protocol Stack

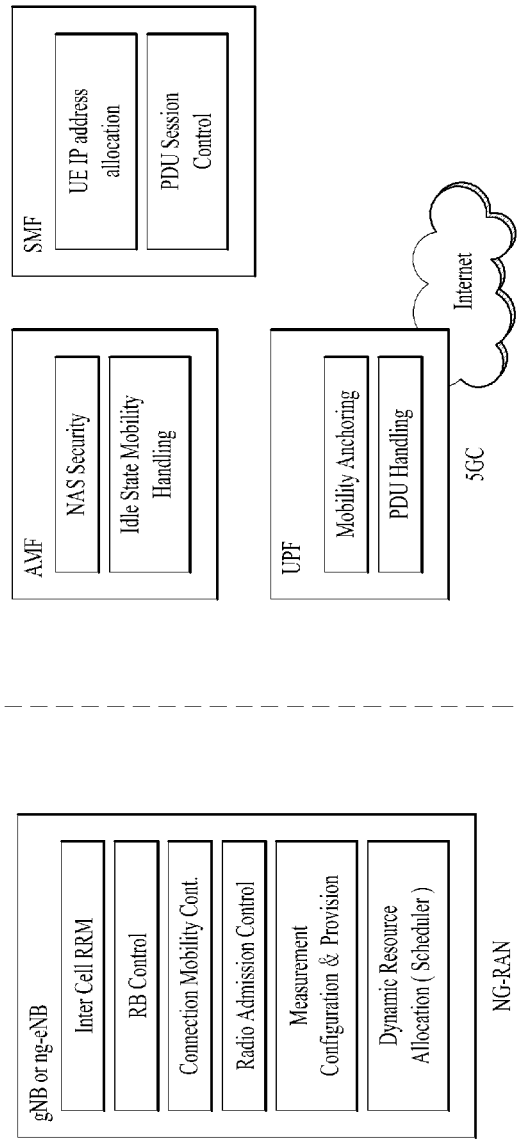

(a) Control-Plane Protocol Stack (b) User-Plane Protocol Stack

METHOD FOR TRANSMITTING LOSSLESS DATA PACKET BASED ON QUALITY OF SERVICE (QOS) FRAMEWORK IN WIRELESS COMMUNICATION SYSTEM AND A DEVICE THEREFOR

This application is a National Stage Entry of International Application No. PCT/KR2018/002325 filed Feb. 26, 2018, which claims the benefit of U.S. Provisional Application No. 62/475,851 filed Mar. 23, 2017, all of which are hereby incorporated by reference in their entirety for all purposes as if fully set forth herein.

TECHNICAL FIELD

The present invention relates to a wireless communication system and, more particularly, to a method for transmitting lossless data packet based on QoS framework in wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for transmitting lossless data packet based on QoS framework in wireless communication system.

The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

In this invention, it is proposed of lossless and in-sequence delivery for QoS flow relocation when QoS flow to DRB mapping is changed.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 4B is a block diagram depicting architecture of functional Split between NG-RAN and 5G Core Network (5GC);

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
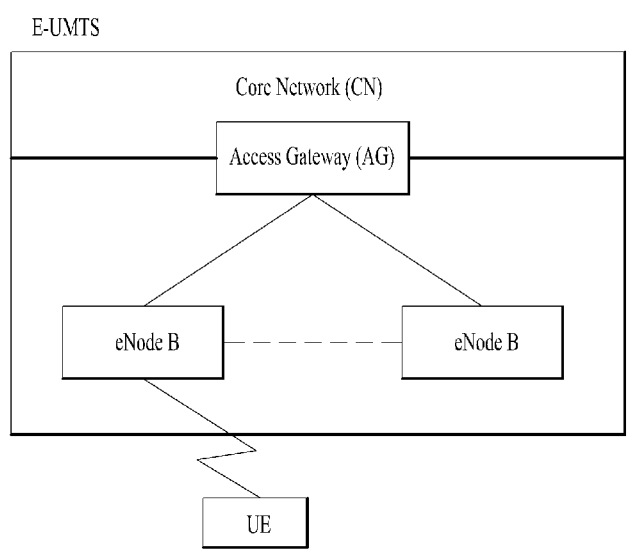
FIG. 1 is a diagram showing a network structure of an Evolved Universal Mobile Telecommunications System (E-UMTS) as an example of a wireless communication system.
Figure 2A:
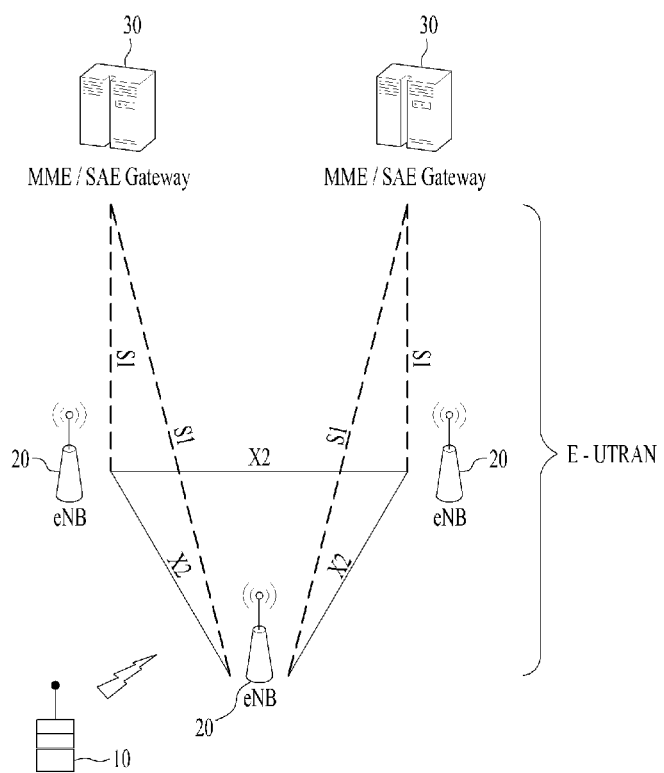
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
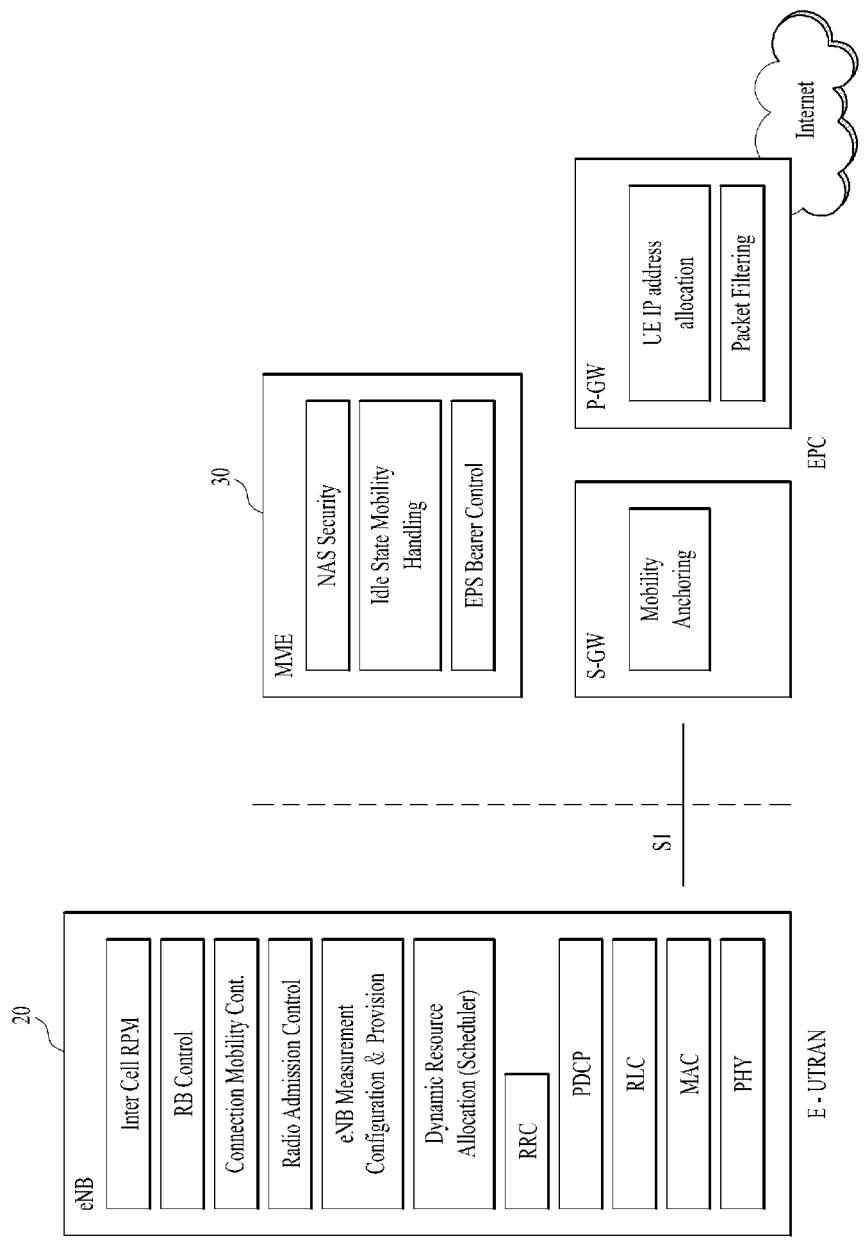
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an Si interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
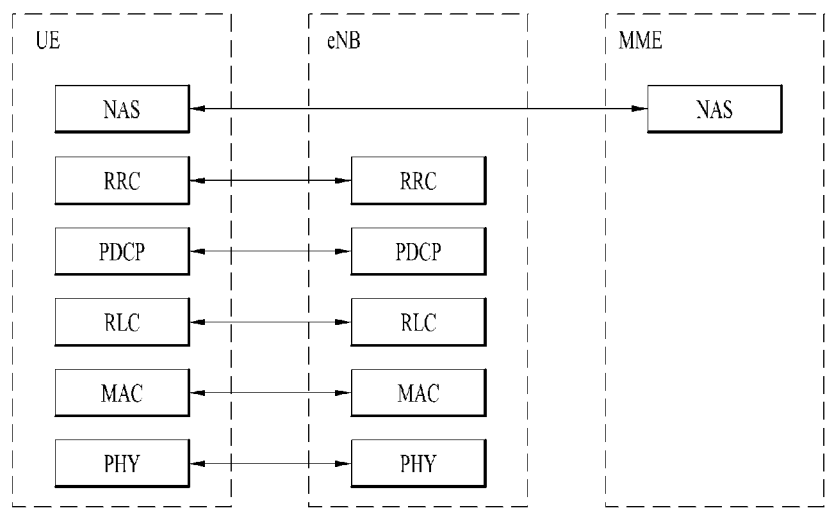
FIG. 3 is a diagram showing a control plane and a user plane of a radio interface protocol between a UE and an E-UTRAN based on a 3rd generation partnership project (3GPP) radio access network standard.
Figure 3:
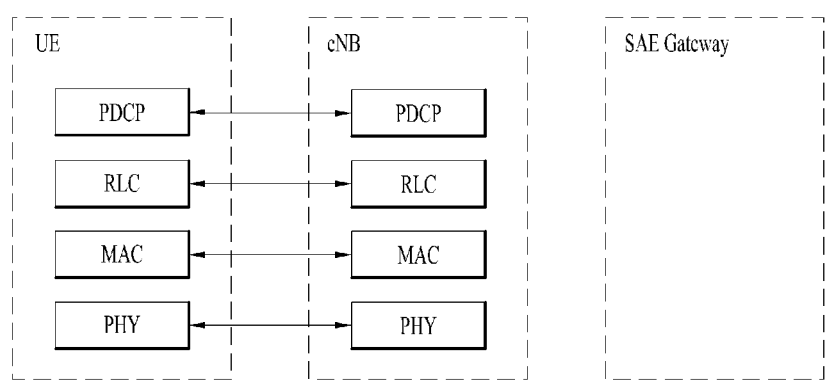

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
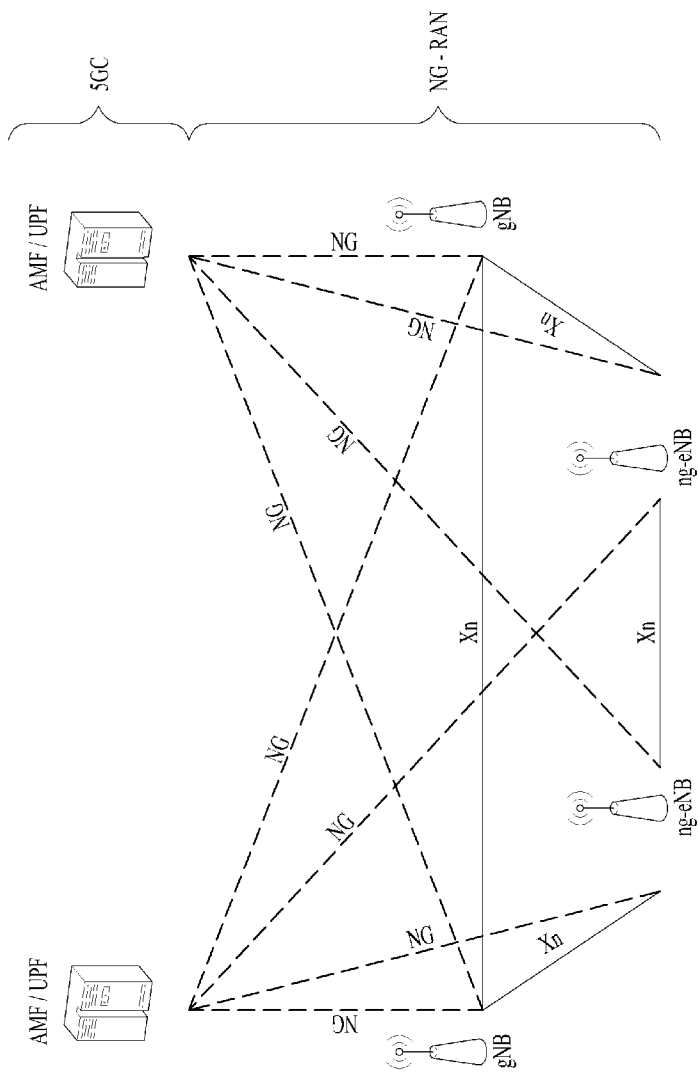
FIG. 4A is a block diagram illustrating network structure of NG Radio Access Network (NG-RAN) architecture.

FIG. 4a is a block diagram illustrating network structure of NG Radio Access Network (NG-RAN) architecture, and FIG. 4b is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
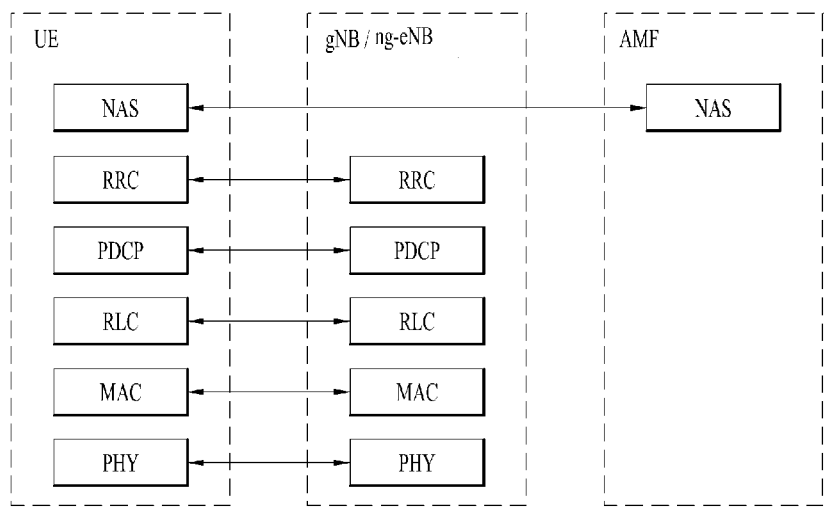
FIG. 5 is a diagram showing a control plane and a user plane of a radio interface protocol between a UE and a NG-RAN based on a 3rd generation partnership project (3GPP) radio access network standard.
Figure 5:
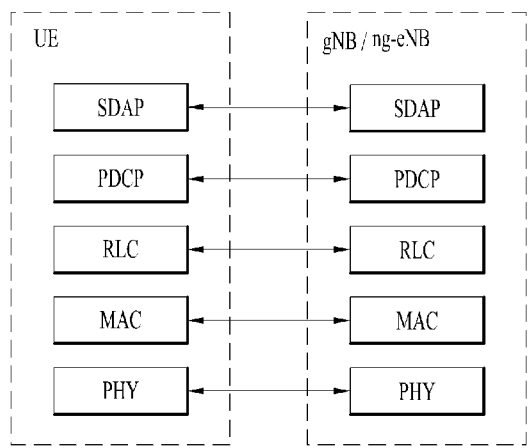

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
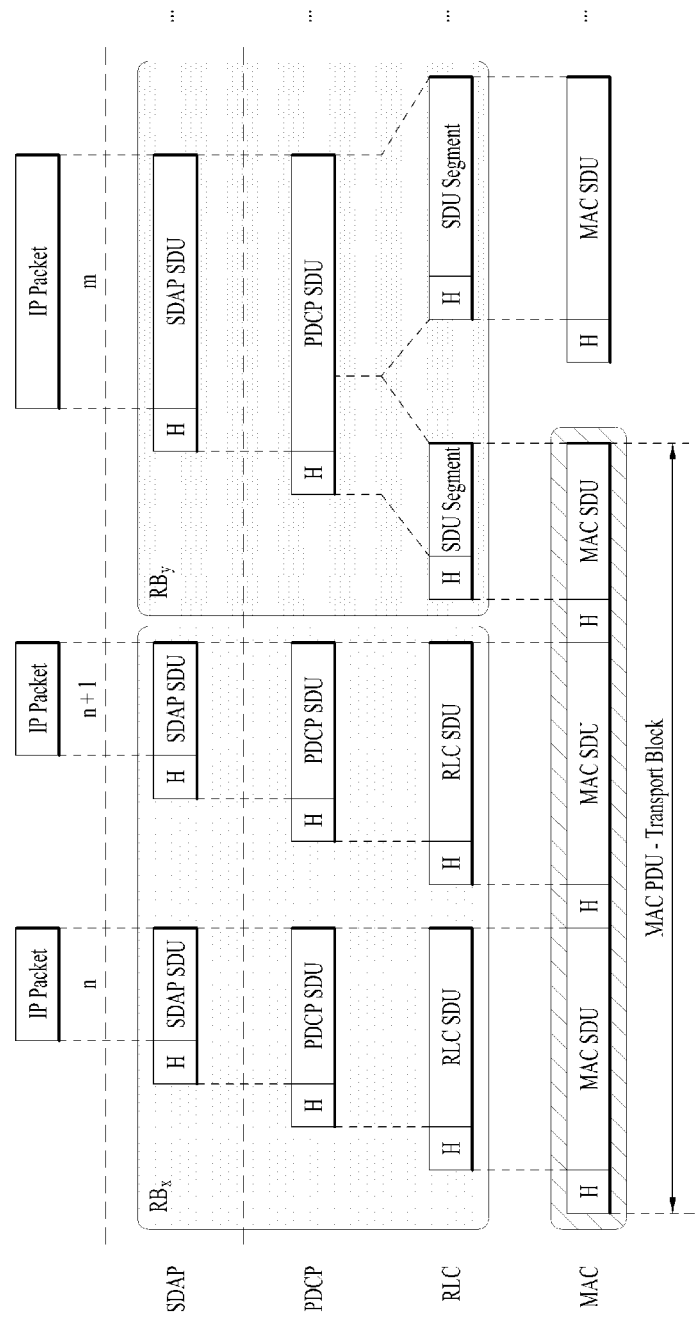
FIG. 6 is an example for L2 data flow between a UE and a NG-RAN.

FIG. 6 is an example for L2 data flow between a UE and a NG-RAN.

An example of the Layer 2 Data Flow is depicted on FIG. 6, where a transport block is generated by MAC by concatenating two RLC PDUs from RBx and one RLC PDU from RBy. The two RLC PDUs from RBx each corresponds to one IP packet (n and n+1) while the RLC PDU from RBy is a segment of an IP packet (m).

Figure 7:
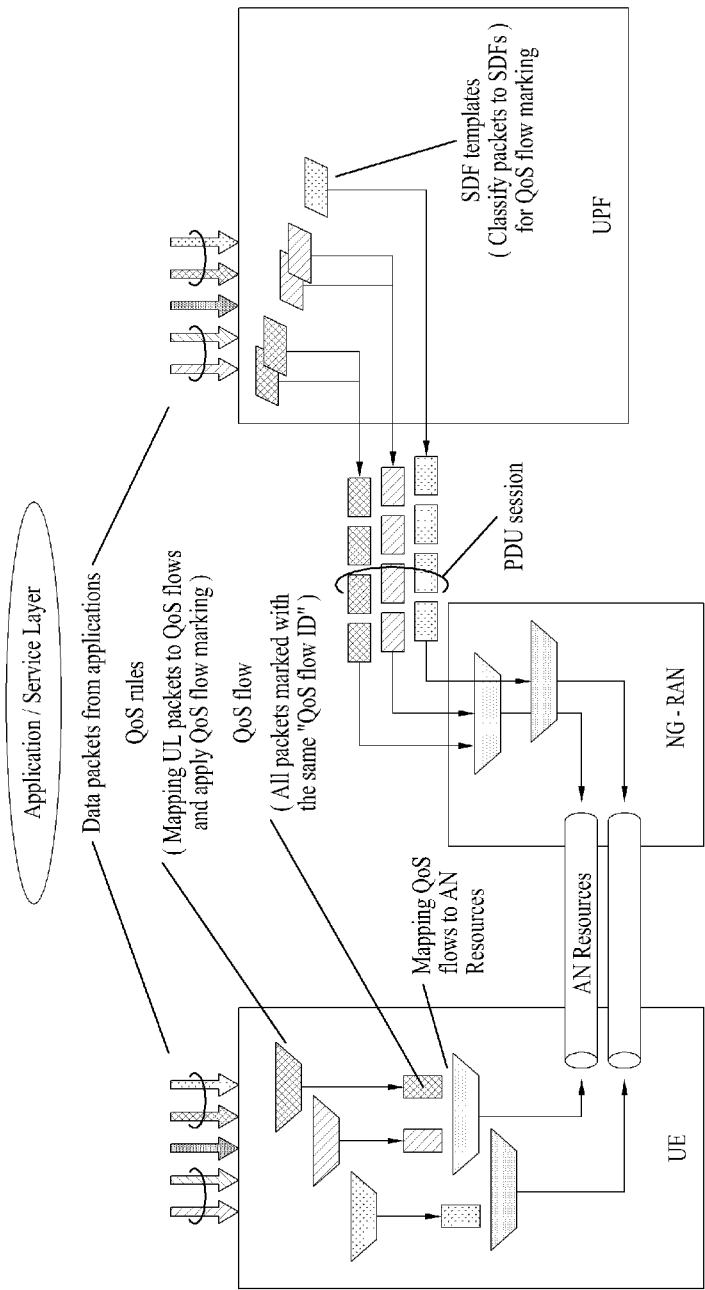
FIG. 7 is a diagram for classification and user plane marking for QoS flows and mapping to NG-RAN resources.

FIG. 7 is a diagram for classification and user plane marking for QoS flows and mapping to NG-RAN resources.

The 5G QoS model is based on QoS flows. The 5G QoS model supports both QoS flows that require guaranteed flow bit rate (GBR QoS flows) and QoS flows that do not require guaranteed flow bit rate (non-GBR QoS flows). The 5G QoS model also supports reflective QoS.

The QoS flow is the finest granularity of QoS differentiation in the PDU session. A QoS Flow ID (QFI) is used to identify a QoS flow in the 5G System. User plane traffic with the same QFI within a PDU Session receives the same traffic forwarding treatment (e.g. scheduling, admission threshold). The QFI is carried in an encapsulation header on N3 (and N9) i.e. without any changes to the e2e packet header. QFI shall be used for all PDU session types. The QFI shall be unique within a PDU session. The QFI may be dynamically assigned or may be equal to the 5QI.

Within the 5G System, a QoS flow is controlled by the SMF and may be preconfigured, or established via the PDU Session Establishment procedure, or the PDU Session Modification procedures.

Any QoS flow is characterized by: i) a QoS profile provided by the SMF to the NG-RAN via the AMF over the N2 reference point or preconfigured in the NG-RAN, ii) one or more QoS rule(s) which can be provided by the SMF to the UE via the AMF over the N1 reference point and/or derived by the UE by applying reflective QoS control, and iii) one or more SDF templates provided by the SMF to the UPF.

The UE performs the classification and marking of UL user plane traffic, i.e. the association of UL traffic to QoS flows, based on QoS rules. These QoS rules may be explicitly provided to the UE (using the PDU Session Establishment/Modification procedure), preconfigured in the UE or implicitly derived by UE by applying reflective QoS.

Reflective QoS enables the UE to map UL user plane traffic to QoS flows by creating UE derived QoS rules in the UE based on the received DL traffic.

A QoS rule contains a QoS rule identifier which is unique within the PDU session, the QFI of the associated QoS flow and a packet filter set for UL and optionally for DL and a precedence value. Additionally, for a dynamically assigned QFI, the QoS rule contains the QoS parameters relevant to the UE (e.g. 5QI, GBR and MBR and the Averaging Window). There can be more than one QoS rule associated with the same QoS Flow (i.e. with the same QFI)

A default QoS rule is required for every PDU Session and associated with the QoS flow of the default QoS rule. The principle for classification and marking of user plane traffic and mapping of QoS flows to NG-RAN resources is illustrated in FIG. 7.

In DL, incoming data packets are classified by the UPF based on SDF templates according to their SDF precedence, (without initiating additional N4 signaling). The UPF conveys the classification of the user plane traffic belonging to a QoS flow through an N3 (and N9) user plane marking using a QFI. The NG-RAN binds QoS flows to NG-RAN resources (i.e. Data Radio Bearers). There is no strict 1:1 relation between QoS flows and NG-RAN resources. It is up to the NG-RAN to establish the necessary NG-RAN resources that QoS flows can be mapped to.

In UL, the UE evaluates UL packets against the packet filter set in the QoS rules based on the precedence value of QoS rules in increasing order until a matching QoS rule (i.e. whose packet filter matches the UL packet) is found. The UE uses the QFI in the corresponding matching QoS rule to bind the UL packet to a QoS flow.

Figure 8:
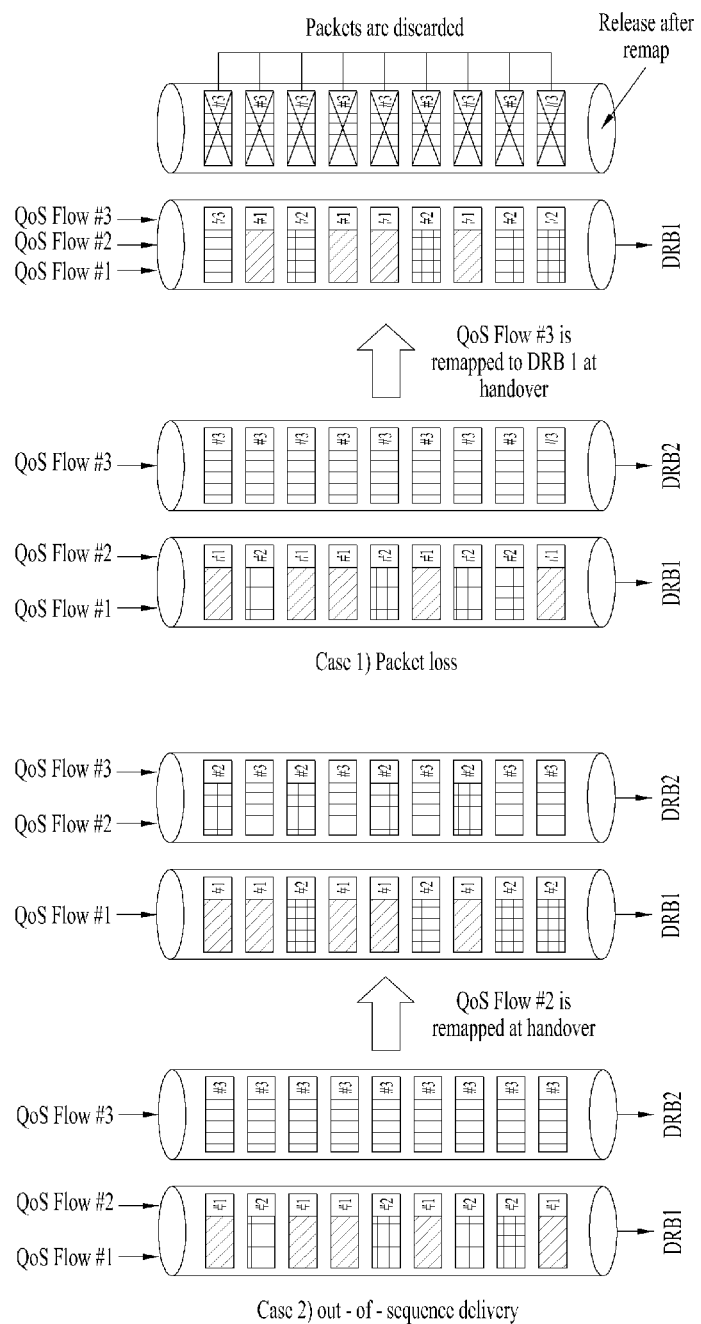
FIG. 8 is an example of problem for packet loss and out-of-sequence delivery when the QoS flow to DRB mapping rules is changed in the prior art.

FIG. 8 is an example of problem for packet loss and out-of-sequence delivery when the QoS flow to DRB mapping rules is changed in the prior art.

When the QoS flow to DRB mapping rule(s) is changed, the UE or gNB cannot guarantee the in-sequence delivery and packet loss problem. The FIG. 8 illustrates the packet loss and out-of-sequence delivery when the QoS flow to DRB mapping rule(s) is changed.

In case of Packet loss, let assume that a DRB 2 is only associated with QoS flow #3 before handover. However, if the QoS flow #3 to DRB mapping is changed to DRB 1 at handover, the DRB 2 is not associated with any other QoS flow. So, the PDCP entity associated with DRB 2 may be released, and discards all buffered PDCP SDUs. It may lead to the packet loss.

In case of Out-of-sequence delivery, if a QoS flow #2 to DRB mapping is changed from DRB 1 to DRB 2, the packet in DRB 2 may arrive at the PDAP receiver later than the packet in DRB 1. Since there is no SN defined in SDAP entity, which is a higher layer of the PDCP entity, the SDAP cannot reorder the packets received out-of-order. Thus, the SDAP entity cannot support in-sequence delivery to upper layer.

Figure 9:
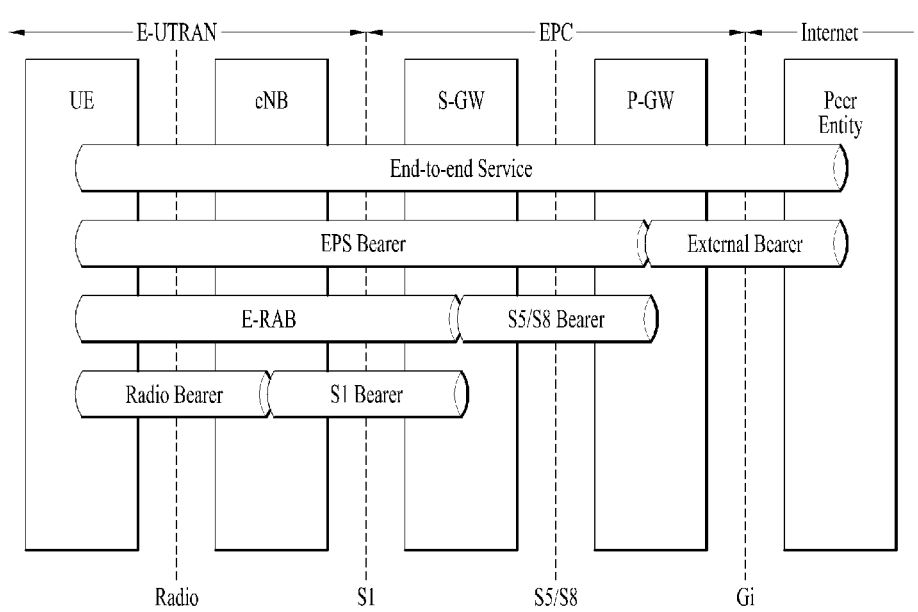
FIG. 9 is a conceptual diagram for EPS bearer service architecture in LTE (E-UTRAN) system.

FIG. 9 is a conceptual diagram for EPS bearer service architecture in LTE (E-UTRAN) system.

In the EPC/E-UTRAN, an EPS bearer/E-RAB is the level of granularity for bearer level QoS control and multiple SDFs (Service Data Flow) can be multiplexed onto the same EPS bearer by UE's TFT (Traffic Flow Template) or P-GW's TFT. As shown in the FIG. 9, an E-RAB transports the packets of an EPS bearer between the UE and the EPC. When an E-RAB exists, there is a one-to-one mapping between this E-RAB and an EPS bearer. A data radio bearer transports the packets of an EPS bearer between a UE and one or more eNB(s). When a data radio bearer exists, there is a one-to-one mapping between this data radio bearer and the EPS bearer/E-RAB. Therefore, data flows to RB mapping does not change during the handover.

Figure 10:
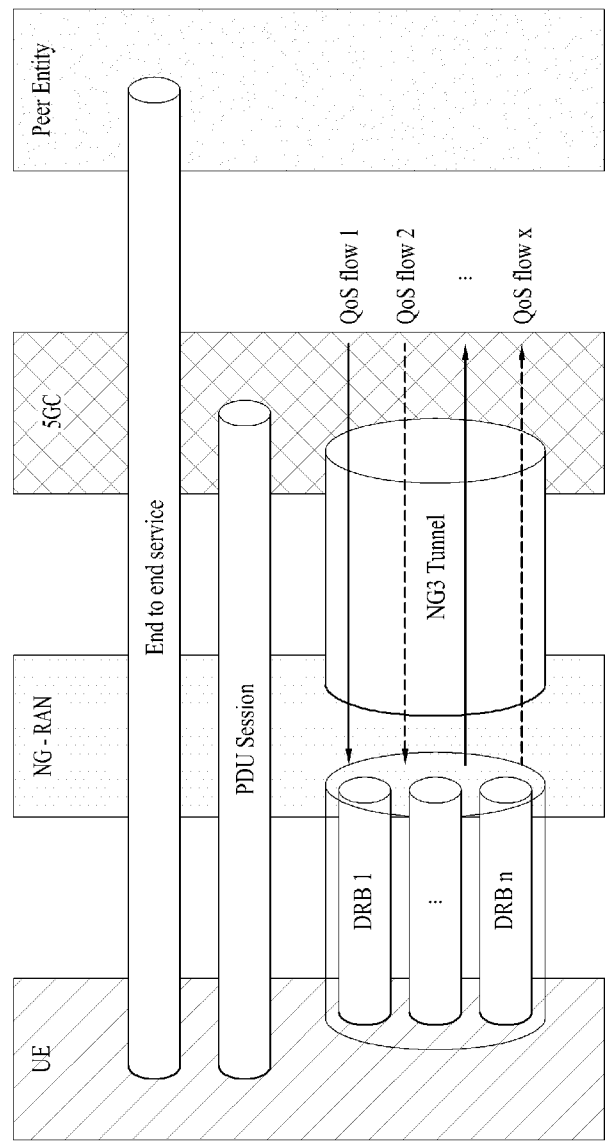
FIG. 10 is a conceptual diagram for 5G QoS model.

FIG. 10 is a conceptual diagram for 5G QoS model.

As shown in the FIG. 10, multiple user plane traffics (e.g, IP flow) can be multiplexed onto the same QoS flow and multiple QoS flows can be multiplexed onto the same DRB (Data Radio Bearer). In DL, 5GC is responsible for the IP flow to QoS flow mapping and NG-RAN is responsible for the QoS flow to DRB mapping. In UL, the UE performs a 2-step mapping of IP flows, in which NAS is responsible for the IP flow to QoS flow mapping, and AS is responsible for the QoS flow to DRB mapping. In other words, the UE maps an IP flow to a QoS flow according to the QoS rules such as default QoS rule, pre-authorised QoS rule and/or reflective QoS rule which 5GC provides to the UE. And then, the UE maps the QoS flow to a DRB according to the AS mapping rules which the NG-RAN provides to the UE.

Contrary to EPC/E-UTRAN, QoS flows to DRB mapping can be changed during the handover because AS mapping rule is able to be decided again by target NG-RAN. Therefore this introduces some differences with regard to data forwarding compared to EPC/E-UTRAN, and LTE based lossless data handling based on PDCP SN cannot be directly applied.

In NR and LTE connected to NG Core, the mapping of the QoS flows to a DRB is up to RAN node (eNG/gNB) implementation. This implies that data sent over the DRB in source node may not go over the same DRB in the target node and hence the SN used for the data in the source node cannot be continued in the target node.

As a packet sent over a DRB in the source side may be sent over a different DRB on the target side, the SN from the source cannot be re-used by the target node. For example, QoS flow 1 and 2 are mapped to DRB 1 in source gNB while they are mapped to different DRBs (DRB1 and DRB 2) in target gNB. Packets from QoS flow 1 may be sent with SN 1, 3, 4, 6 and QoS flow 2 with SN of 2, 5 over DRB1 on the source side. In the target side, QoS flow 2 can be mapped to DRB2 with hence the sequence numbers 2 and 5 for these packets cannot be reused. When these packets are sent over DRB2, with say, SN 1, 2, UE has no means to identify them as packets 2, 5 of DRB1 from the source side. Hence the solutions used in LTE, to use PDCP to perform in-sequence lossless delivery and status reports cannot be applied for RAN connected to NG Core.

Cumulative forwarding may need to be applied at (re-)transmission of the QoS flow for which new AS mapping rule should be applied as well as other QoS flows which were multiplexed with the QoS flow onto the same DRB prior to the handover. It can be wasteful retransmission and cause longer packet delay. Thus, new data handling/forwarding mechanism needs to be designed for flow based QoS framework.

Figure 11:
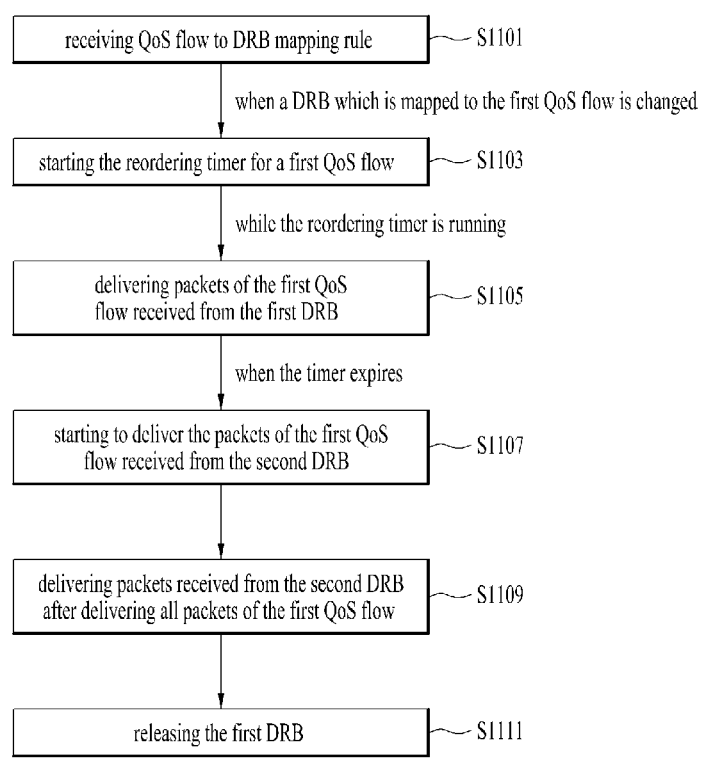
FIG. 11 is a conceptual diagram for transmitting lossless data packet based on QoS framework in wireless communication system according to embodiments of the present invention.

FIG. 11 is a conceptual diagram for transmitting lossless data packet based on QoS framework in wireless communication system according to embodiments of the present invention.

The invention is that, for DL packet reception, a UE receives a QoS flow to DRB mapping rule change information from a gNB such that a QoS flow mapping is changed from an old DRB to a new DRB (S1101).

Preferably, the UE receives QoS flow to DRB mapping rule from the gNB via RRC reconfiguration message or SDAP PDU, PDCP PDU, RLC PDU or MAC PDU.

Preferably, a reordering timer is used for determining the configured time. So, when a DRB which is mapped to the first QoS flow is changed from a first DRB to a second DRB, the UE starts the reordering timer for a first QoS flow (S1103).

Preferably, the timer value of the reordering timer may be received via RRC reconfiguration message or Service Data Adaptation Protocol (SDAP)/PDCP/RLC/MAC PDU, and may be received together with QoS flow to DRB mapping rule change information.

Preferably, one reordering timer is configured for one QoS flow.

The UE delays delivery of packets of the QoS flow received from the new DRB for a configured time, the UE delivers packets of the QoS flow received from the old DRB to the upper layer during the configured time (S1105).

That is, while the reordering timer is running, the UE delivers packets of the first QoS flow received from the first DRB to an upper layer of the UE. Meanwhile, packets of the first QoS flow received from the second DRB are stored while the timer is running in a temporary buffer.

Preferably, the temporary buffer may be implemented in SDAP entity, PDCP entity, or between PDCP and SDAP entity. One temporary buffer is configured for one QoS flow.

After the configured time elapses, the UE does not delivers packets of the QoS flow received from the old DRB to the upper layer, and delivers the packets of the QoS flow received from the new DRB to an upper layer (S1107).

That is, when the timer expires, starting to deliver the packets of the first QoS flow received from the second DRB while stopping the delivering packets of the first QoS flow received from the first DRB.

After all stored packets of the first QoS flow are delivered to upper layer, the UE delivers packets received from the second DRB to the upper layer and discards the packets of the QoS flow received from the old DRB (S1109).

Preferably, for each received packet, the UE checks from which DRB it is received and to which QoS flow it should be delivered. The checking of which DRB is performed by Logical Channel ID (LCID), DRB ID, etc. The checking of which QoS flow is performed by QoS flow ID. Those IDs are included in the received packets, or implicitly known by configured DRB, PDCP entity, or SDAP entity.

Preferably, when the UE delivers the packets of the QoS flow to the upper layer, the UE delivers packets in increasing order of sequence number. A PDCP SN or SDAP SN may be used for in-order delivery.

If the old DRB is not mapped to any of a QoS flow after the configured time, the UE may release the old DRB (i.e. first DRB) when the configured time elapses and the UE discarding the delivering packets of the first QoS flow received from the first DRB (S1111). Preferably, this invention may be performed in a new layer located above PDCP, called SDAP (Service Data Adaptation Protocol) layer, and the SDAP layer performs mapping between a QoS flow and a data radio bearer, or performs marking QoS flow ID in both DL and UL packets, or is applicable for connections to the NextGen Core, or is configured for each individual PDU session. The PDU session refers to association between the UE and a data network that provides a PDU connectivity service.

Figure 12:
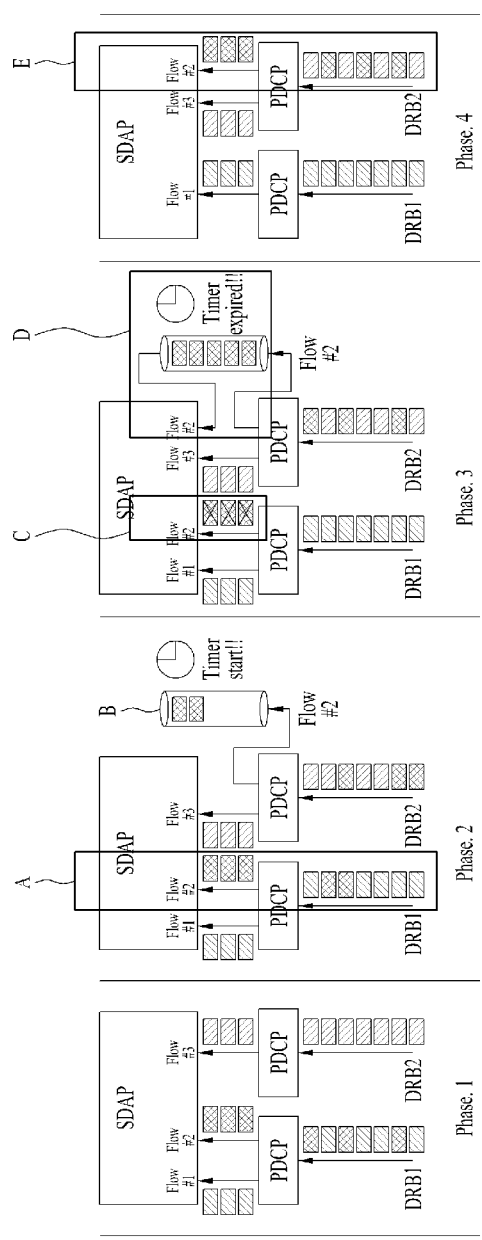
FIG. 12 is an example for transmitting lossless data packet based on QoS framework in wireless communication system according to embodiments of the present invention.

FIG. 12 is an example for transmitting lossless data packet based on QoS framework in wireless communication system according to embodiments of the present invention.

Phase. 1 shows that the SDAP receiver entity receives reconfiguration message containing the timer value from RRC. In this case, the QoS flow #2 is remapped from DRB 1 to DRB 2.

Phase. 2 shows that the SDAP receiver entity starts the timer for QoS flow #2. While the timer is running, the SDAP receiver entity delivers the SDAP PDUs associated with the QoS flow #2 from the DRB 1 only to upper layer (A) and the SDAP receiver entity stores SDAP PDUs associated with the QoS flow #2 received from DRB 2 in the temporary buffer (B). And also the SDAP PDUs associated with the QoS flow #3 received from DRB 2 to upper layer.

Phase. 3 shows that when the timer expires, the SDAP receiver entity discards all SDAP PDUs associated with the QoS flow #2 received from DRB 1 (C), if any, and the SDAP receiver entity delivers all SDAP PDUs associated with QoS flow #2 stored in temporary buffer to upper layer (D).

Phase. 4 shows that after all the SDAP PDUs stored in the temporary buffer are delivered to upper layer, the SDAP receiver entity delivers SDAP PDUs associated with the QoS flow #2 received from DRB 2 to upper layer (E).

Figure 13:
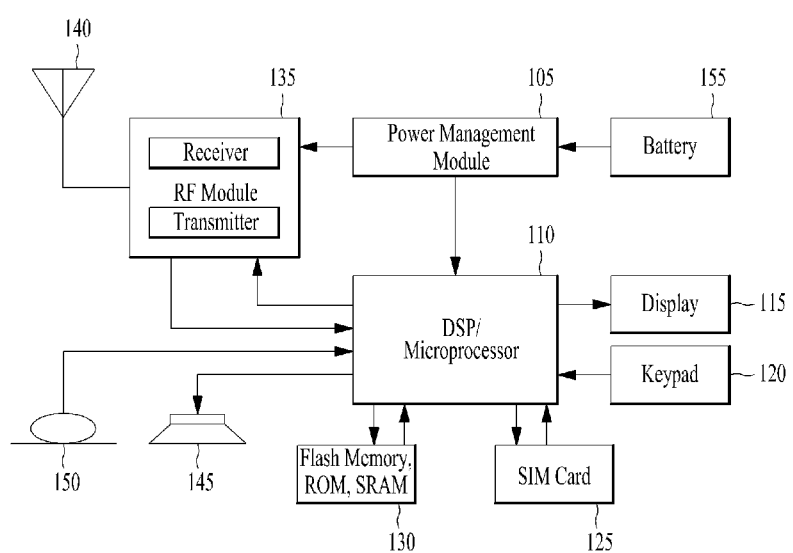
FIG. 13 is a block diagram of a communication apparatus according to an embodiment of the present invention.

FIG. 13 is a block diagram of a communication apparatus according to an embodiment of the present invention.

The apparatus shown in FIG. 13 can be a user equipment (UE) and/or eNB adapted to perform the above mechanism, but it can be any apparatus for performing the same operation.

As shown in FIG. 13, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 13 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 13 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system, the method comprising:
   starting a timer for a first Quality of Service (QoS) flow when a data radio bearer (DRB) which is mapped to the first QoS flow is changed from a first DRB to a second DRB;
   while the timer is running, delivering packets of the first QoS flow received from the first DRB to an upper layer, wherein packets of the first QoS flow received from the second DRB are stored while the timer is running; and
   when the timer expires, starting to deliver the packets of the first QoS flow received from the second DRB while stopping the delivering packets of the first QoS flow received from the first DRB.

2. The method according to claim 1, wherein after all stored packets of the first QoS flow are delivered to upper layer, packets received from the second DRB are delivered to the upper layer.

3. The method according to claim 1, further comprising: when the timer expires, if the first DRB is not mapped to any of QoS flows, releasing the first DRB.

4. The method according to claim 1, wherein the packets are delivered to the upper layer in increasing order of corresponding sequence number.

5. The method according to claim 1, wherein the packets of the first QoS flow received from the second DRB are stored in the temporary buffer while the timer is running,
   wherein the temporary buffer is in a Service Data Adaptation Protocol (SDAP) entity which is a higher layer than a Packet Data Convergence Protocol (PDCP) entity of the UE or the PDCP entity of the UE, or between the PDCP and the SDAP entity.

6. The method according to claim 1, further comprising:
   when the timer expires, discarding the delivering packets of the first QoS flow received from the first DRB.

7. The method according to claim 1, wherein the UE is capable of communicating with at least one of another UE, a UE related to an autonomous driving vehicle, a base station and/or a network.

8. A user equipment (UE) for operating in a wireless communication system, the UE comprising:
   a Radio Frequency (RF) module; and
   a processor operably coupled with the RF module and configured to:
   start a timer for a first Quality of Service (QoS) flow when a data radio bearer (DRB) which is mapped to the first QoS flow is changed from a first DRB to a second DRB;
   while the timer is running, deliver packets of the first QoS flow received from the first DRB—to an upper layer, wherein packets of the first QoS flow received from the second DRB are stored while the timer is running; and
   when the timer expires, start to deliver the packets of the first QoS flow received from the second DRB while stopping the delivering packets of the first QoS flow received from the first DRB.

9. The UE according to claim 8, wherein after all stored packets of the first QoS flow are delivered to upper layer, packets received from the second DRB are delivered to the upper layer.

10. The UE according to claim 8, wherein the processor is further configured to:
    release the first DRB if the first DRB is not mapped to any of QoS flows, when the timer expires.

11. The UE according to claim 8, wherein the packets are delivered to the upper layer in increasing order of corresponding sequence number.

12. The UE according to claim 8, wherein the packets of the first QoS flow received from the second DRB are stored in the temporary buffer while the timer is running,
    wherein the temporary buffer is in a Service Data Adaptation Protocol (SDAP) entity which is a higher layer than a Packet Data Convergence Protocol (PDCP) entity of the UE or the PDCP entity of the UE, or between a PDCP and SDAP entity.

13. The UE according to claim 8, wherein the processor is further configured to:
    discard the delivering packets of the first QoS flow received from the first DRB when the timer expires.

14. The UE according to claim 8, wherein the UE is capable of communicating with at least one of another UE, a UE related to an autonomous driving vehicle, a base station and/or a network.

* * * * *